United States Patent
Szeppat et al.

(10) Patent No.: US 12,187,258 B2
(45) Date of Patent: Jan. 7, 2025

(54) METHOD FOR OPERATING A VEHICLE, AND VEHICLE

(71) Applicant: AUDI AG, Ingolstadt (DE)

(72) Inventors: Enrico Szeppat, Lunzenau OT Göritzhain (DE); Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 317 days.

(21) Appl. No.: 17/761,000

(22) PCT Filed: Nov. 10, 2020

(86) PCT No.: PCT/EP2020/081571
§ 371 (c)(1),
(2) Date: Mar. 16, 2022

(87) PCT Pub. No.: WO2021/115700
PCT Pub. Date: Jun. 17, 2021

(65) Prior Publication Data
US 2022/0332299 A1    Oct. 20, 2022

(30) Foreign Application Priority Data
Dec. 10, 2019  (DE) .......................... 102019133643.0

(51) Int. Cl.
*B60T 8/52* (2006.01)
*B60W 30/18* (2012.01)

(52) U.S. Cl.
CPC ......... *B60T 8/52* (2013.01); *B60W 30/18109* (2013.01); *B60W 2510/18* (2013.01)

(58) Field of Classification Search
CPC ..... B60T 8/52; B60T 8/58; B60T 8/74; B60T 13/662; B60T 2260/04; B60W 30/18109;
(Continued)

(56) References Cited

U.S. PATENT DOCUMENTS

| 6,356,188 B1 | 3/2002 | Meyers et al. |
| 8,166,843 B2 * | 5/2012 | Kojima ................ F16H 61/688 477/80 |

(Continued)

FOREIGN PATENT DOCUMENTS

| CN | 103939599 A | 7/2014 |
| CN | 107499185 A | 12/2017 |

(Continued)

OTHER PUBLICATIONS

German Examination Report issued on Aug. 12, 2020, in connection with corresponding German Application No. 102019133643.0 (10 pp., including machine-generated English translation).

(Continued)

*Primary Examiner* — Pamela Rodriguez
(74) *Attorney, Agent, or Firm* — Maier & Maier, PLLC

(57) ABSTRACT

A method for operating a vehicle having a transmission and a braking device during a journey, during which the vehicle, the transmission of which comprises at least one form-fitting shifting element, moves along a roadway, wherein during the journey of the motor vehicle, its shifting element is movable into formfitting interaction with at least one further component, an anti-lock braking operation is carried out by the braking device, in which at least one braking torque to be applied by the braking device to at least one wheel of the vehicle for braking the wheel is limited at least temporarily to a specifiable value by a regulating device of the vehicle in order to thereby at least temporarily prevent the wheel from locking relative to the roadway.

11 Claims, 1 Drawing Sheet

(58) Field of Classification Search
CPC ........... B60W 2510/18; B60W 10/184; B60W 2520/10; B60W 2520/28; F16H 61/16; F16H 2059/506; F16H 2061/163
See application file for complete search history.

(56) References Cited

U.S. PATENT DOCUMENTS

| | | | |
|---|---|---|---|
| 8,465,394 B2 * | 6/2013 | Cuppers | B60W 10/115 477/109 |
| 9,388,899 B2 * | 7/2016 | Schiele | F16D 48/06 |
| 10,989,300 B2 * | 4/2021 | Hofmann | F16H 59/54 |
| 2009/0247358 A1 | 10/2009 | Kojima et al. | |
| 2015/0204441 A1 | 7/2015 | Kinoshita | |

FOREIGN PATENT DOCUMENTS

| | | |
|---|---|---|
| DE | 102009004426 A1 | 10/2009 |
| DE | 102016200819 A1 | 7/2017 |
| DE | 102017211656 A1 | 1/2019 |
| EP | 3112204 B1 | 7/2018 |
| JP | 2007239809 A | 9/2007 |
| JP | 2017125548 A | 7/2017 |
| WO | 2019007758 A1 | 1/2019 |

OTHER PUBLICATIONS

International Preliminary Report on Patentability with English translation issued on May 17, 2022, in corresponding International Application No. PCT/EP2020/081571; 17 pages.
International Search Report (with English Translation) issued on Feb. 4, 2021 in corresponding International Patent Application No. PCT/EP2020/081571; 5 pages.
Office Action issued on Mar. 22, 2024, in corresponding Chinese Application No. 202080079737.0, 15 pages.

* cited by examiner

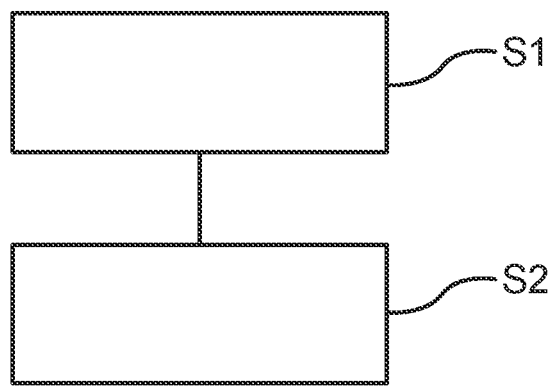

METHOD FOR OPERATING A VEHICLE, AND VEHICLE

FIELD

The invention relates to a method for operating a vehicle.

BACKGROUND

JP 2017125548 discloses a gear change control device of a vehicle. The gear change control device sets a prescribed gear change step when a vehicle velocity reaches a prescribed vehicle velocity or a lower velocity, and also comprises a controller for controlling a stepped automatic transmission. In the case in which a deceleration of the vehicle, when the vehicle velocity is at or below the prescribed vehicle velocity, is greater than the preset prescribed deceleration, the controller prevents downshifting into the prescribed gear change step.

Furthermore, a vehicle having four-wheel drive comprising a clutch control device is known from EP 3 112 204 B1.

In addition, so-called anti-lock braking systems of vehicles are known from the general prior art. The anti-lock braking systems are also typically referred to as automatic anti-lock devices. The anti-lock braking systems are used to carry out braking operations with at least almost maximum utilization of a frictional connection between a respective tire of a wheel of a respective vehicle and a roadway, while the respective vehicle is moving along the roadway. The above-mentioned braking operations are also referred to as anti-lock braking operations. During such an anti-lock braking operation, the respective wheel of the vehicle is braked by means of a respective braking device of the respective vehicle, in that the braking device applies a braking torque to the respective wheel. The braking torque to be applied by the braking device to the wheel is at least temporarily, i.e., at least briefly, limited to a predefinable value by means of a regulating device, which is electronic in particular, of the anti-lock braking system, in order to prevent the wheel from locking relative to the road at least temporarily.

This limitation of the braking torque takes place, for example, as a function of at least one control value, which can characterize slippage of the wheel relative to the roadway. One underlying concept of such an anti-lock braking system is, for example, that maximum braking decelerations can be achieved at specific slip values depending on the roadway condition and the tires of the wheel. By limiting the braking torque, the braking torque is set in such a way that the braking torque does not exceed the value and the slip is as close as possible to a slip value that is optimal for the greatest possible braking deceleration, at least during a major part of the anti-lock braking operation, so that on the one hand a very strong deceleration or braking of the vehicle can be implemented and, on the other hand, locking of the wheel can be prevented, however. As a result, the vehicle remains steerable and stable, for example, since the wheel that does not lock can still absorb lateral control forces.

SUMMARY

The object of the present invention is to create a method for operating a vehicle and a vehicle such that damage to the vehicle and/or unpleasant noises can be avoided.

A first aspect of the invention relates to a method for operating a vehicle during a journey of the vehicle, wherein the vehicle is preferably designed as a motor vehicle, in particular an automobile. During the journey, the vehicle moves along a roadway. For example, the vehicle is driven along the road during the journey. The vehicle has at least one transmission and at least one braking device, by means of which the vehicle can be braked. In particular, the vehicle has at least one wheel which can be braked by means of the braking device in order to brake the vehicle, in particular as a whole. The transmission has at least one form-fitting shifting element, which can be designed, for example, as a claw clutch or as a shifting claw.

The shifting element can, for example, fundamentally be moved, in particular relative to a transmission housing of the transmission and/or translationally, between at least one decoupled position and at least one coupled position. In the coupled position, the shifting element is, for example, in a form-fitting interaction with at least one other component of the transmission. The shifting element can, for example, rotate around an axis of rotation relative to the transmission housing, wherein it is possible in particular for the shifting element to rotate around the axis of rotation relative to the transmission housing during the journey. In the coupled position, the shifting element is coupled in a formfitting manner to the further component, so that the shifting element and the further component then rotate or can rotate jointly around the axis of rotation relative to the transmission housing. In the decoupled position, a form-fitting interaction of the shifting element with the further component is eliminated, so that the shifting element does not interact or is not coupled in a form-fitting manner with the further component in the decoupled position. Then, for example, the shifting element and the component can rotate around the axis of rotation relative to one another.

During the journey of the motor vehicle, an anti-lock braking operation is carried out by means of the braking device, in which, for example, a braking torque for braking the wheel and thus for braking the vehicle as a whole is applicable or is applied by the braking device to at least one wheel of the vehicle. The wheel is a ground contact element of the vehicle, which is supportable or is supported downwards on the roadway via the wheel during the journey in the vertical direction of the vehicle. During the anti-lock braking operation, the braking torque applied or to be applied by the braking device to the wheel to brake the wheel and thus the vehicle is at least temporarily limited to a predefinable value by means of a regulating device, which is in particular electronic, of the vehicle to thus at least temporarily prevent locking of the wheel relative to the roadway. A so-called anti-lock braking system or a so-called automatic anti-lock device is thus formed by the regulating device of the vehicle and by the braking device.

To be able to avoid damage and/or unpleasant, undesired noises during the journey, in particular during the anti-lock braking operation, it is provided according to the invention that at least one value is ascertained during the anti-lock braking operation, which can also be denoted as a speed value and characterizes a change in a speed of the wheel, which takes place in particular during the anti-lock braking operation. For example, the value characterizes a speed gradient or the value is a speed gradient which characterizes the change in the speed of the wheel.

During the anti-lock braking operation, as a function of the ascertained value, a movement of the shifting element that is fundamentally possible and can be effectuated, for example, by means of an actuator and causes the formfitting interaction of the shifting element with the other component is prevented at least temporarily, in particular actively or deliberately. This can be understood in particular as follows: The transmission comprises, for example, the above-mentioned actuator, by means of which, for example, the shifting element can be moved at least from the decoupled position into the coupled position, in particular actively, and for example relative to the further component. According to the invention, it is now provided that the movement effectuating the formfitting interaction of the shifting element with the further component is deliberately prevented, for example although an electronic computing device, also referred to as a control unit or designed as a control unit, or a module of such an electronic computing device, requests or desires the movement of the shifting element, which is to be effectuated in particular by means of the actuator and effectuates the formfitting interaction of the shifting element with the further component. The computing device is, for example, a transmission control unit for operating, in particular controlling or regulating, the transmission.

The movement effectuating the formfitting interaction of the shifting element with the further component is prevented in particular and only then, for example, if the value or the change in the speed characterized by the value exceeds a specifiable or specified threshold value, for example. In particular, the prevention of the movement effectuating the form-fitting interaction of the shifting element with the other component is to be understood as follows: If, for example, an anti-lock braking operation is carried out by means of the braking device during a journey of the vehicle, during which the value or the change in the speed of the wheel is less than the threshold value or corresponds to the threshold value, and if, for example on the basis of a shifting program, the electronic computing device requests a movement of the shifting element from the decoupled position into the coupled position, to be effectuated in particular by means of the actuator, then this movement requested by the electronic computing device, for example, of the shifting element from the decoupled position into the coupled position is permitted, i.e., is not prevented, since in particular because the value or the change in speed does not exceed the threshold value, it can be concluded that when the movement of the shifting element effectuating the form-fitting interaction is actually carried out, neither damage nor undesirable, unpleasant noises will occur. As a result, for example, the movement of the shifting element effectuating the form-fitting interaction is effectuated.

However, if the value or the change in the speed exceeds the threshold value, the movement of the shifting element from the decoupled position into the coupled position effectuating the formfitting interaction of the shifting element with the other component is prevented, in particular despite the described request for movement by the electronic computing device, so that the movement of the shifting element desired or requested by the electronic computing device does not actually take place, but is omitted or delayed or drawn out. As a result, damage to the vehicle, in particular to the transmission, and the occurrence of excessive, unpleasant noises, for example those that are acoustically perceptible by the occupants of the vehicle, can be avoided. The movement is prevented, for example, by means of an electronic control unit, which can be designed, for example, as a further control unit provided in addition to the electronic computing device and/or as a brake control unit. The brake control unit can be the regulating device.

The shifting element is arranged, for example, on a shaft of the transmission and can be rotated with the shaft around the axis of rotation relative to the transmission housing. In particular, the shifting element, which is designed, for example, as a shifting sleeve, can be coupled to the shaft in a rotationally-fixed manner. However, the shifting element can be moved in the axial direction of the shaft relative to the shaft and relative to the transmission housing between the decoupled position and the coupled position. The further component is, for example, a gear wheel or a shifting toothing of the gear wheel, wherein the gear wheel is an idler wheel arranged on the shaft. In the decoupled position, the idler wheel is decoupled from the shaft, so that the idler wheel and the shaft rotate or can rotate relative to one another around the axis of rotation. In the coupled position, however, the idler wheel is coupled in the shaft in a torque-transmitting manner, in particular in a rotationally-fixed manner, via the shifting element, so that in the coupled position the idler wheel, the shifting element, and the shaft rotate or can rotate together around the axis of rotation relative to the transmission housing.

The method according to the invention now makes it possible, when the speed of the wheel and thus, for example, a speed of the shifting element, changes excessively, to avoid the movement of the shifting element effectuating the formfitting interaction of the shifting element with the further component, so that damage and undesired noises can be avoided.

The invention is based in particular on the following findings: an anti-lock braking operation is a special driving condition in which strong oscillations of the wheel or velocities of the wheel can occur. For example, the wheel may momentarily lose contact with the roadway as a result of or during the anti-lock braking operation, which may result in a strong change in the speed of the wheel. It is also conceivable that after the wheel has lost its contact with the roadway, it suddenly comes into contact with the roadway again, which can also result in a strong change in the speed of the wheel. Such strong changes in the speed of the wheel can result in strong changes in a speed of the transmission and in particular the speed of the shifting element at an output of the transmission.

While the shifting element is in the decoupled position, the shifting element rotates, for example, relative to the idler wheel or vice versa, so that there is a speed difference between the shifting element and the further component. In the course of the movement of the shifting element from the decoupled position into the coupled position—as is well known from the general prior art—a synchronization, also referred to as synchronizing, takes place between the shifting element and the other component, wherein the speed difference between the shifting element and the component is at least reduced or eliminated, in particular by friction, by the synchronization so that as a result the shifting element can then be engaged or switched through and thus brought into formfitting interaction with the other component without excessive stress on the shifting element or the other component, damage, and noise perceptible as rattling occurring. This synchronization is also known as locking synchronization. It can be ensured by means of the synchronization that the shifting element is synchronized with or to the further component, in particular frictionally, before it is brought into formfitting interaction with the further component, so that there is synchronicity between the shifting element and the further component.

This is to be understood in particular to mean that the shifting element and the further component then rotate at equal or the same speed and thus jointly or simultaneously around the axis of rotation relative to the transmission housing. Starting from this synchronicity, in which the shifting element is coupled to the other component, for example frictionally, the shifting element can be engaged or switched through and thereby brought into formfitting interaction with the other component. If, for example, the shifting element were engaged at a point in time at which there was an excessively strong change in the speed of the wheel and thus of the shifting element, in particular such that the value or the change exceeded the threshold value, it could happen that in the period of time between the achieved synchronicity and the form-fitting interaction of the shifting element with the component there is an undesired asynchronicity between the shifting element and the further component.

In other words, it has been found that an excessively strong change in the speed of the wheel and a resulting excessively strong change in the speed of the shifting element can result in asynchronicity, i.e., an undesired rotation between the shifting element and the component, after the shifting element and the component have reached synchronicity and before the shifting element is actually engaged. When the shifting element is engaged, damage or noise can then occur, which can be perceived as scratching or rattling noises by the occupants in the interior of the vehicle. In other words, producing an asynchronous form fit between the shifting element and the further component results in shifting scratches and possibly component damage, in particular on the shifting element and possibly on the actuator. The above-mentioned problems and disadvantages can now be avoided by the method according to the invention. By determining and thus taking into consideration the value or the change in the speed, critical driving states, i.e., special driving states, can be recognized and engagement of the shifting element can be prevented at least temporarily.

By engaging the shifting element, a gear, in particular a forward gear, of the transmission can be or will be engaged, for example. Thus, the feature that the movement effectuating the formfitting interaction of the shifting element with the other component, i.e., the engagement of the shifting element, is at least temporarily prevented can be understood to mean that an or the engagement of the above-mentioned gear is at least temporarily prevented. As a result, acoustically noticeable gear engagement processes and component damage can be reliably avoided.

The value is ascertained, for example, in such a way that the speed of the wheel is ascertained, in particular detected, in particular by means of a speed sensor. The speed of the wheel is ascertained, in particular detected, for example, by an ABS controller and/or by an ESP controller and/or by an ASR controller (ABS—anti-lock braking system; ESP—electronic stability program; ASR—anti-slip regulation). For example, the speed sensor provides a signal, in particular an electrical signal, which includes multiple revolution values characterizing the speed of the wheel. The value is, for example, a difference between at least two of the revolution values, so that, for example, the change in the speed of the wheel is characterized by at least one difference between at least two of the revolution values.

In order to be able to implement particularly advantageous component protection and to be able to avoid undesirable noises in a particularly advantageous manner, it is provided in one embodiment of the invention that the wheel is coupled to the transmission in a torque-transmitting manner. As a result, excessively strong changes in the speed of the wheel can result in excessively strong changes in the speed of the shifting element or a speed of a transmission element of the transmission, wherein the method can avoid undesired effects resulting from such excessively strong changes in the speed.

In order to be able to avoid noise and damage particularly reliably, it is provided in a further embodiment of the invention that during the anti-lock braking operation, at least one velocity, also referred to as the driving velocity, at which the vehicle moves along the roadway during the anti-lock braking operation, is ascertained, wherein during the anti-lock braking operation, the movement effectuating the formfitting interaction of the shifting element with the further component is prevented as a function of the ascertained velocity.

A further embodiment is distinguished in that at least one braking value characterizing the braking torque is ascertained during the anti-lock braking operation, wherein during the anti-lock braking operation, the movement effectuating the formfitting interaction of the shifting element with the further component is prevented as a function of the ascertained braking value and thus, for example, at least indirectly as a function of the braking torque. As a result, unfavorable special driving conditions, in which there can be excessive changes in the speed of the wheel and, as a result, noise and possibly damage, can be reliably identified, so that noise and damage can be reliably avoided.

For example, the braking value characterizes a brake pressure to effectuate the braking torque, so that, for example, on the basis of the ascertained or detected speed and on the basis of the brake pressure or the braking torque, the engagement of the gear is at least temporarily avoided. The speed or the signal characterizing the speed and, for example, the braking value are provided, for example, by a brake control unit, by means of which the braking device is operated, in particular regulated.

In one particularly advantageous embodiment of the invention, the vehicle comprises a drive motor, by means of which the wheel and thereby the vehicle and the transmission are drivable. The wheel is therefore preferably a drivable or driven wheel. As a result, noise and damage can be avoided particularly well.

Finally, it has proven to be particularly advantageous if, while the movement effectuating the formfitting interaction of the shifting element with the further component is prevented, a gear of the transmission is engaged and kept engaged. In other words, when a critical situation is recognized in which engaging another gear could result in damage and/or noise, engaging this other gear is avoided or prevented, and the currently engaged gear is maintained. If the special driving condition has ended, for example when the anti-lock braking operation has ended and/or the value or the speed does not (or no longer) exceeds the threshold value, the avoidance of the movement effectuating the formfitting interaction of the shifting element with the other component, that is to say the avoidance of the engagement of the gear is canceled, so that as a result, for example, the currently engaged gear can be disengaged and the other gear can be engaged, for example by moving the shifting element from the decoupled position to the coupled position.

A second aspect of the invention relates to a vehicle, preferably designed as a motor vehicle, in particular as an automobile, which is designed to carry out a method according to the invention according to the first aspect of the invention. Advantages and advantageous designs of the first aspect of the invention are to be regarded as advantages and advantageous designs of the second aspect of the invention and vice versa.

The invention also includes refinements of the vehicle according to the invention, which have features as have already been described in conjunction with the refinements of the method according to the invention. For this reason, the corresponding refinements of the vehicle according to the invention are not described again here.

The vehicle according to the invention is preferably designed as a motor vehicle and preferably as an automobile, in particular as a passenger vehicle or truck, or as a passenger bus or motorcycle.

The invention also comprises combinations of the features of the described embodiments.

BRIEF DESCRIPTION OF THE FIGURE

An exemplary embodiment of the invention is described hereinafter. For this purpose, the single FIGURE shows a flow chart to illustrate a method according to the invention for operating a vehicle during a journey of the vehicle.

DETAILED DESCRIPTION

The exemplary embodiment explained hereinafter is a preferred embodiment of the invention. In the exemplary embodiment, the described components of the embodiment each represent individual features of the invention that are to be considered independently of one another and that also refine the invention independently of one another. Therefore, the disclosure is also intended to comprise combinations of the features of the embodiment other than those illustrated. Furthermore, the described embodiment can also be supplemented by further features of the invention that have already been described.

A method for operating a vehicle is explained hereinafter on the basis of the single FIGURE. The vehicle is preferably a motor vehicle, in particular an automobile, and has multiple wheels, a transmission, and at least one drive motor, designed, for example, as an electric motor or an internal combustion engine. The wheels are drivable by the drive motor via the transmission, as a result of which the motor vehicle as a whole is drivable or is driven. The transmission has, for example, at least two gears different from one another, which differ from each other in particular with regard to their transmission ratios. The respective gear can be engaged and disengaged. The vehicle also has a braking device, by means of which the wheels and thus the motor vehicle as a whole can be braked. For this purpose, the braking device can apply a braking torque to the respective wheel.

The transmission has, for example, at least one shaft which is rotatable around an axis of rotation relative to a transmission housing of the transmission. On the shaft, for example, a gearwheel designed as an idler wheel is arranged, which is, for example, a gearwheel of a first of the gears. A formfitting shifting element, which is designed, for example, as a shifting sleeve and is also referred to as a claw clutch, is assigned to the idler wheel and is arranged, for example, on the shaft. The shifting element is co-rotatable with the shaft around the axis of rotation relative to the transmission housing and is connected to the shaft in a torque-transmitting, in particular rotationally-fixed manner. The shifting element can be moved in the axial direction of the shaft relative to the shaft, relative to the idler wheel, and relative to the transmission housing translationally from at least one decoupled position into a coupled position. The idler wheel is a further component of the transmission or is also referred to as a further component, wherein the idler wheel has shifting teeth designed, for example, as short teeth. In addition, the shifting sleeve has further shifting teeth corresponding to the shifting teeth. In the decoupled position, a form-fitting interaction of the shifting sleeve with the idler wheel is unconnected or canceled, so that the shaft and the shifting sleeve are rotatable around the axis of rotation relative to the idler wheel. In the decoupled position, however, the shifting teeth interact in a form-fitting manner, in that the shifting teeth are in engagement with one another. As a result, the shifting sleeve interacts with the idler wheel in a form-fitting manner, as a result of which the idler wheel is coupled to the shaft in a torque-transmitting manner, in particular in a rotationally-fixed manner, via the shifting sleeve. As a result, the shaft, the shifting sleeve, and the idler wheel can rotate jointly around the axis of rotation relative to the transmission housing.

In order, for example, to move the shifting element (shifting sleeve) from the decoupled position to the coupled position and thereby move the shifting element into form-fitting interaction with the idler wheel (further component) and as a result engage the first gear, an actuator is provided, for example, which can be part of the transmission. The actuator can be operated or actuated, for example, pneumatically, hydraulically, or electrically and can be activated, in particular controlled or regulated, for example, by a transmission control unit. By activating the actuator, the shifting element is moved from the decoupled position into the coupled position, for example by means of the actuator.

The above-mentioned method is carried out, for example, during a journey during which, for example, the second gear is engaged and the first gear is disengaged. Disengaging the second gear and engaging the first gear is also referred to as a gear change. During the journey, the vehicle moves along a roadway on which the vehicle is supportable or is supported downwards in the vehicle vertical direction via the wheels. During the journey, an anti-lock braking operation is carried out by means of the braking device, during which the braking torque to be applied to the respective wheel by the braking device to brake the respective wheel is at least temporarily limited to a specifiable value by means of an electronic regulating device, to thus at least temporarily prevent locking of the respective wheel relative to the roadway.

In order to be able to reliably avoid unwanted noises and damage, the method comprises a first step S1, in which at least one value is ascertained during the anti-lock braking operation, i.e., while the anti-lock braking operation is carried out, in particular using an electronic computing device of the motor vehicle. The value characterizes a change in a speed of the respective wheel that takes place during the anti-lock braking operation, which wheel, at least during the anti-lock braking operation, is coupled in a torque-transmitting manner to the transmission and, for example, to the shaft and thus to the shifting element. Thus, an excessively strong change in the speed of the wheel would result in an excessively strong change in a speed of the shifting element, which rotates at its speed around the axis of rotation relative to the transmission housing.

In order to carry out the anti-lock braking operation, a speed sensor, for example, ascertains, in particular detects, the speed of the wheel. The speed sensor provides a signal characterizing the speed of the wheel detected by means of the speed sensor, in particular an electrical signal, which is received, for example, by the regulating device, also referred to as the brake control unit. Alternatively or additionally, the signal is received by the electronic computing device, which can be the brake control unit or the transmission control unit. The value characterizing the change in speed is ascertained, in particular calcu-lated or detected, for example, by means of the electronic computing device, in particular by means of the regulating device and/or by means of the transmission control unit as a function of the signal or as a function of the speed detected by the speed sensor.

In a second step S2 of the method, in particular by means of the electronic computing device, as a function of the ascertained value, a or the movement of the shifting element that is fundamentally possible and can be effectuated, for example, by means of the actuator and effectuates the formfitting interaction of the shifting element with the further component is at least temporarily actively or deliberately prevented, in particular although, for example, the transmission control unit requests the movement of the shifting element to be effectuated by means of the actuator, which effectuates the formfitting interaction of the shifting element (shifting sleeve) with the further component (idler wheel). If the electronic computing device is the brake control unit, for example, the brake control unit now prevents the movement of the shifting element from the decoupled position into the coupled position that is desired by the transmission control unit. This avoids the above-mentioned gear change. In other words, this avoids the first gear being engaged, for example, while there is an excessively strong change in the speed of the wheel and thus in the speed of the shifting element. As a result, an asynchronous form fit between the shifting element and the further component can be avoided, as a result of which excessive loads on the transmission, damage to the vehicle, in particular the transmission, and undesired, excessive noise can be prevented. If it is ascertained, for example, that the ascertained value exceeds a specified or specifiable threshold value, for example, then it is thereby ascertained that the vehicle is currently in a special driving condition, also referred to as a special driving situation. The method can thus be used to avoid an excessive change in the rotational speed of the shifting element occurring in this special driving situation, as a result of which damage and/or noise can be avoided.

It is also conceivable that the electronic computing device is the transmission control unit. For example, different software blocks are active in the transmission control unit, by means of which respective functions of the transmission can be effectuated. One of the software blocks is, for example, fundamentally responsible for ascertaining and effectuating the above-described gear change or the engagement of the first gear. For example, if one software block ascertains the gear change, this software block requests the gear change, for example, in particular from another software block, which then controls the actuator accordingly, or one software block activates the actuator to effectuate the ascertained gear change. In the scope of the method, it can be provided that the movement of the shifting element effectuating the formfitting interaction of the shifting element with the further component is prevented in the transmission control unit or by means of the transmission control unit. In this case, for example, one software block and/or the other software block is deactivated, so that, for example, the request for the gear change that can be provided by the one software block is already prevented. There is no intervention in the one software block itself, since it can and should request or effectuate the gear change accordingly for other, normal driving situations. In the present special driving situation, the request for the gear change is blocked. In other words, it is blocked, for example, that the request made by the one software block results in the gear change. In particular, the gear change is blocked until the present special driving situation is over.

The invention claimed is:

1. A method for operating a vehicle having a transmission and a braking device during a journey, during which the vehicle, the transmission of which comprises at least one formfitting shifting element, moves along a roadway, wherein during the journey of the motor vehicle, its shifting element is movable into formfitting interaction with at least one further component, an anti-lock braking operation is carried out by the braking device, in which at least one braking torque to be applied by the braking device to at least one wheel of the vehicle for braking the wheel is limited at least temporarily to a specifiable value by a regulating device of the vehicle in order to thereby at least temporarily prevent the wheel from locking relative to the roadway, wherein, during the anti-lock braking operation:
   at least one speed value characterizing a change in a speed of the wheel is ascertained,
   at least one braking value characterizing the braking torque is ascertained, and
   as a function of the speed value and the braking value, a movement of the shifting element effectuating the formfitting interaction of the shifting element with the further component is at least temporarily prevented.

2. The method as claimed in claim 1, wherein the wheel is coupled to the transmission in a torque-transmitting manner.

3. The method as claimed in claim 2, wherein during the anti-lock braking operation, at least one velocity at which the vehicle moves along the roadway during the anti-lock braking operation is ascertained, wherein during the anti-lock braking operation, the movement effectuating the formfitting interaction of the shifting element with the further component is prevented as a function of the ascertained velocity.

4. The method as claimed in claim 2, wherein the vehicle has a drive motor, by which the wheel and thereby the vehicle are drivable via the transmission.

5. The method as claimed in claim 2, wherein while the movement effectuating the formfitting interaction of the shifting element with the further component is prevented, a gear of the transmission is engaged and kept engaged.

6. The method as claimed in claim 1, wherein during the anti-lock braking operation, at least one velocity at which the vehicle moves along the roadway during the anti-lock braking operation is ascertained, wherein during the anti-lock braking operation, the movement effectuating the formfitting interaction of the shifting element with the further component is prevented as a function of the ascertained velocity.

7. The method as claimed in claim 6, wherein the vehicle has a drive motor, by which the wheel and thereby the vehicle are drivable via the transmission.

8. The method as claimed in claim 6, wherein while the movement effectuating the formfitting interaction of the shifting element with the further component is prevented, a gear of the transmission is engaged and kept engaged.

9. The method as claimed in claim 1, wherein the vehicle has a drive motor, by which the wheel and thereby the vehicle are drivable via the transmission.

10. The method as claimed in claim 9, wherein while the movement effectuating the formfitting interaction of the shifting element with the further component is prevented, a gear of the transmission is engaged and kept engaged.

11. The method as claimed in claim 1, wherein while the movement effectuating the formfitting interaction of the shifting element with the further component is prevented, a gear of the transmission is engaged and kept engaged.

* * * * *